US011165846B2

United States Patent
Sun et al.

(10) Patent No.: US 11,165,846 B2
(45) Date of Patent: Nov. 2, 2021

(54) DYNAMICALLY CONVERTING STATIC AND DYNAMIC CONNECTIONS IN A STREAMING APPLICATION

(71) Applicant: International Business Machines Corporation, Armonk, NY (US)

(72) Inventors: Jingdong Sun, Rochester, MN (US); Roger Mittelstadt, Byron, MN (US); Rafal Konik, Oronoco, MN (US); Jessica R. Eidem, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 16/448,568

(22) Filed: Jun. 21, 2019

(65) Prior Publication Data

US 2020/0404041 A1    Dec. 24, 2020

(51) Int. Cl.
*H04L 29/06* (2006.01)
*H04L 29/08* (2006.01)

(52) U.S. Cl.
CPC .......... *H04L 65/80* (2013.01); *H04L 65/1069* (2013.01); *H04L 65/1086* (2013.01); *H04L 65/601* (2013.01); *H04L 67/141* (2013.01); H04L 65/1073 (2013.01); H04L 65/4084 (2013.01); H04L 65/602 (2013.01); H04L 67/14 (2013.01); H04L 67/148 (2013.01)

(58) Field of Classification Search
CPC . H04L 65/80; H04L 65/1069; H04L 65/1086; H04L 65/601; H04L 67/141; H04L 65/1073; H04L 65/4084; H04L 65/602; H04L 67/14; H04L 67/148
See application file for complete search history.

(56) References Cited

U.S. PATENT DOCUMENTS

| 5,195,750 A | 3/1993 | Courialis |
| 5,790,880 A | 8/1998 | Ireton |

(Continued)

OTHER PUBLICATIONS

IBM, "Static and dynamic stream connections in SPL", printed from https://www.ibm.com/support/knowledgecenter/3SCRJU_4.0.0/com.ibm.streams.dev.doc/doc/staticanddynamicstream.html on May 28, 2019.

*Primary Examiner* — Philip J Chea
*Assistant Examiner* — Ruth Solomon
(74) *Attorney, Agent, or Firm* — Edward J. Wixted, III

(57) ABSTRACT

A streams manager includes a connection converter that allows converting at run-time a static connection to a dynamic connection, and converting at run-time a dynamic connection to a static connection. One or more conversion criteria are defined that determine when a conversion of one or more connections is needed at run-time. When conversion criteria for converting a static connection from a first processing element to a second processing element to a dynamic connection is satisfied, the first processing element interacts with the streams manager and with the second processing element to dynamically change the static connection to a dynamic connection. When conversion criteria for converting a dynamic connection from a first processing element to a second processing element to a static connection is satisfied, the first processing element interacts with the streams manager and with the second processing element to dynamically change the dynamic connection to a static connection.

19 Claims, 15 Drawing Sheets

(56) References Cited

U.S. PATENT DOCUMENTS

| | | | |
|---|---|---|---|
| 7,415,689 B2 | 8/2008 | Taylor | |
| 7,613,902 B1 | 11/2009 | Martin et al. | |
| 9,146,775 B2 | 9/2015 | Branson et al. | |
| 9,195,559 B2* | 11/2015 | Branson | G06F 11/3048 |
| 9,674,230 B1* | 6/2017 | Barsness | H04L 65/60 |
| 10,509,798 B2* | 12/2019 | Chow | G06F 16/252 |
| 10,672,156 B2* | 6/2020 | Simonovic | G06F 8/433 |
| 2008/0235685 A1* | 9/2008 | Amini | G06F 8/41 |
| | | | 718/100 |
| 2009/0193239 A1 | 7/2009 | Hanai et al. | |
| 2011/0041132 A1* | 2/2011 | Andrade | G06F 9/5083 |
| | | | 718/102 |
| 2014/0164628 A1* | 6/2014 | Branson | G06F 9/54 |
| | | | 709/227 |
| 2017/0063723 A1 | 3/2017 | Cao et al. | |
| 2017/0329786 A1* | 11/2017 | Chow | G06F 16/9535 |
| 2018/0053328 A1* | 2/2018 | Simonovic | G06F 8/433 |
| 2018/0121517 A1* | 5/2018 | Barsness | G06F 11/3409 |
| 2018/0260240 A1* | 9/2018 | Kaku | G06F 8/656 |

\* cited by examiner

DYNAMICALLY CONVERTING STATIC AND DYNAMIC CONNECTIONS IN A STREAMING APPLICATION

BACKGROUND

1. Technical Field

This disclosure generally relates to streaming applications, and more specifically relates to converting connections as a streaming application runs.

2. Background Art

Streaming applications are known in the art, and typically include multiple processing elements coupled together in a flow graph that process streaming data in real-time. A processing element typically takes in streaming data in the form of data tuples, operates on the data tuples in some fashion, and outputs the processed data tuples to the next processing element. Streaming applications are becoming more common due to the high performance that can be achieved from real-time processing of streaming data.

Streaming applications allow defining both static connections and dynamic connections. Static connections are connections between processing elements that are defined at compile-time. Dynamic connections are connections between processing elements that can be dynamically created as the streaming application runs. Static connections typically have higher performance than dynamic connections. A known method for converting a static connection to a dynamic connection in a streaming application typically requires modifying the streaming application code to remove the static connection, compiling the streaming application code, then creating the dynamic connection as the streaming application runs.

BRIEF SUMMARY

A streams manager includes a connection converter that allows converting at run-time a static connection to a dynamic connection, and converting at run-time a dynamic connection to a static connection. One or more conversion criteria are defined that determine when a conversion of one or more connections is needed at run-time. When conversion criteria for converting a static connection from a first processing element to a second processing element to a dynamic connection is satisfied, the first processing element interacts with the streams manager and with the second processing element to dynamically change the static connection to a dynamic connection. When conversion criteria for converting a dynamic connection from a first processing element to a second processing element to a static connection is satisfied, the first processing element interacts with the streams manager and with the second processing element to dynamically change the dynamic connection to a static connection. The conversion criteria may include a usage threshold, a user role, a processing deadline, an end user's real-time request, or other criteria.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

A streams manager includes a connection converter that allows converting at run-time a static connection to a dynamic connection, and converting at run-time a dynamic connection to a static connection. One or more conversion criteria are defined that determine when a conversion of one or more connections is needed at run-time. When conversion criteria for converting a static connection from a first processing element to a second processing element to a dynamic connection is satisfied, the first processing element interacts with the streams manager and with the second processing element to dynamically change the static connection to a dynamic connection. When conversion criteria for converting a dynamic connection from a first processing element to a second processing element to a static connection is satisfied, the first processing element interacts with the streams manager and with the second processing element to dynamically change the dynamic connection to a static connection. The conversion criteria may include a usage threshold, a user role, a processing deadline, or other criteria.

Figure 1:
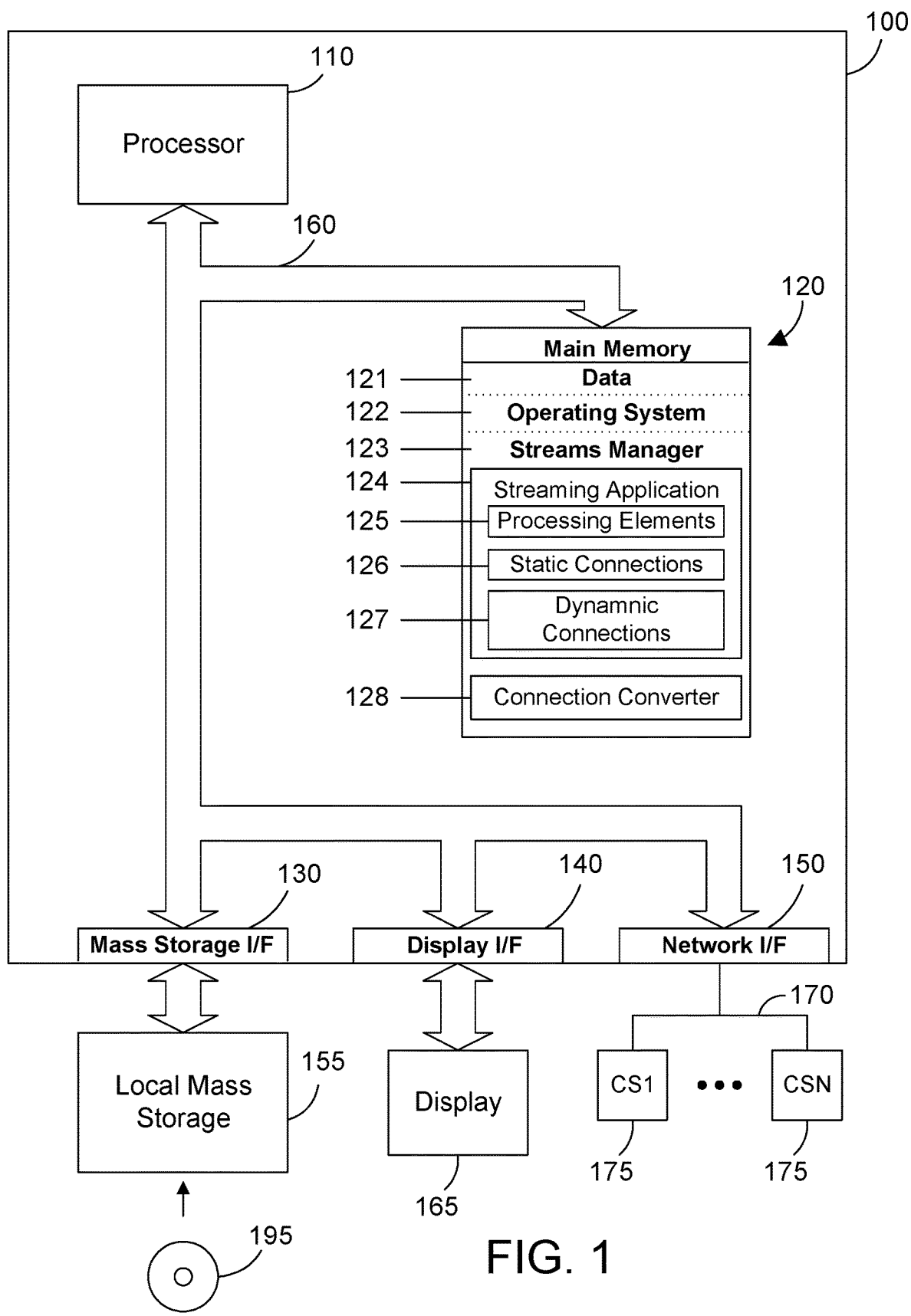
FIG. 1 is a block diagram of a computer system that includes a connection converter that can dynamically convert at run-time static connections to dynamic connections in a streaming application and that can dynamically convert at run-time dynamic connections to static connections in a streaming application.

Referring to FIG. 1, a computer system 100 is one suitable implementation of a server computer system that includes a connection converter as described in more detail below. Server computer system 100 is an IBM POWER9 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is a thumb drive. Still another suitable type of local mass storage device 155 is a hard disk drive or a solid state drive.

Main memory 120 preferably contains data 121, an operating system 122, and a streams manager 123. Data 121 represents any data that serves as input to or output from any program in computer system 100. Operating system 122 is a multitasking operating system, such as AIX or LINUX. The streams manager 123 is software that provides a run-time environment that executes a streaming application 124. The streaming application 124 preferably comprises a flow graph that includes processing elements 125 that process data tuples. The streaming application 124 may include static connections 126 between some processing elements 125 and dynamic connections 127 between some processing elements 125. The combination of the processing elements 125 and connections 126, 127 define a flow graph for the streaming application 124.

The streams manager 123 preferably includes a connection converter 128. The connection converter 128 is a software tool that can dynamically convert at run-time one or more static connections 126 to dynamic connections 127, and can dynamically convert at run-time one or more dynamic connections 127 to static connections 126. As used herein, the term "at run-time" means the connection converter 128 preferably performs its functions as the streaming application 124 is executed by the streams manager 123, as opposed to functions that are hard-coded into the streaming application 124, which require compilation of the streaming application 124 before the streaming application 124 may be executed. While the connection converter 128 is shown as part of streams manager 123, it is equally within the scope of the disclosure and claims herein to provide a connection converter 128 that is separate from the streams manager 123. Functions included in the connection converter 128 are discussed in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and streams manager 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the streams manager 123, which executes the streaming application 124, and also executes the connection converter 128.

Although computer system 100 is shown to contain only a single processor and a single system bus, those skilled in the art will appreciate that a connection converter as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175, shown as CS1, . . . , CSN in FIG. 1, represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
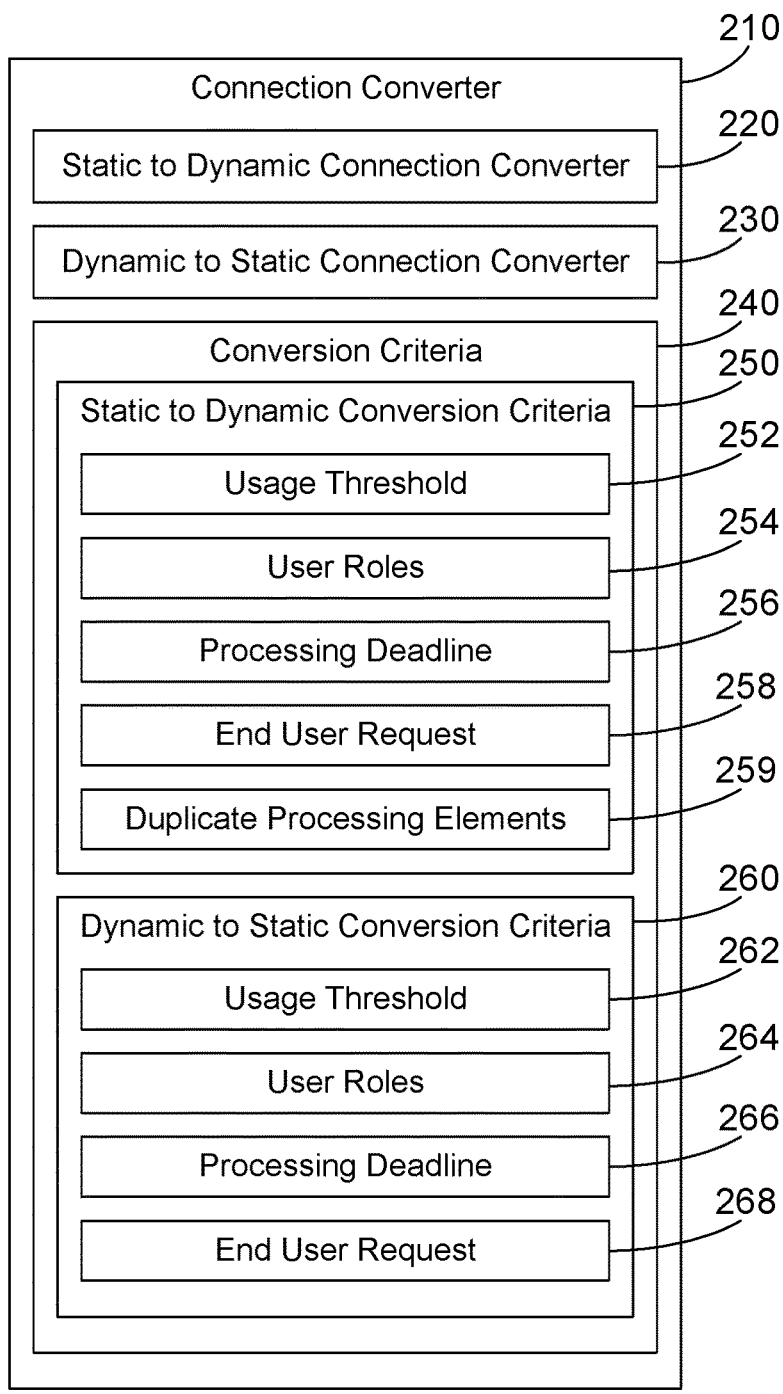
FIG. 2 is a block diagram of one suitable implementation for the connection converter shown in FIG. 1.

FIG. 2 shows a block diagram of a connection converter 210 that is one suitable implementation for the connection converter 128 shown in FIG. 1. The connection converter 210 includes a static to dynamic connection converter 220, a dynamic to static connection converter 230, and conversion criteria 240. The conversion criteria 240 can include static to dynamic conversion criteria 250 and dynamic to static conversion criteria 260. The static to dynamic conversion criteria 250 can include a usage threshold 252, user roles 254, a processing deadline 256, an end user request 258, and duplicate processing elements 259. The usage threshold 252 can specify a numerical threshold for a characteristic of a connection, such resource cost, data tuple rate in tuples per second, or any other suitable measure of traffic on a connection. Static connections are typically faster than dynamic connections due to additional overhead in managing dynamic connections, but cost more resources when deploying from multiple jobs, as shown in the example in FIGS. 20 and 21 discussed below. Thus, when the amount of traffic on a static connection drops to below some usage threshold 252, it makes sense to convert the static connection to a dynamic connection. User roles 254 can specify different roles for different users. For example, users can be divided into two categories according to role, with one role being a normal user and the second role being an important user. Of course, any suitable number of user roles could be defined. When a normal user is using the streaming application, it might make sense to convert based on user roles 254 one or more static connections to dynamic connections. Processing deadline 256 could specify a date and time by which the processing of the streaming application needs to be completed. When the processing deadline 256 is in the distant future, static connections could be converted to dynamic connections. End user request 258 means a user of the streaming application has explicitly requested conversion of a static connection to a dynamic connection. Duplicate processing elements 259 means to convert static connections to dynamic connections when duplicate processing elements exists in multiple instances of an application or in multiple applications. Replacing duplicate processing elements with a single processing element that has dynamic connections to other processing elements can improve overall system performance and resource usage. While specific criteria are shown and discussed above in static to dynamic conversion criteria 250 above, any other suitable criteria that could be used to determine when to convert static connections to dynamic connections, whether currently known or developed in the future.

The dynamic to static conversion criteria 260 can include a usage threshold 262, user roles 264, a processing deadline 266, and end user request 268. The usage threshold 262 can specify a numerical threshold for a characteristic of a connection, such as data tuple rate in tuples per second, or any other suitable measure of traffic on a connection. Because static connections have higher performance than dynamic connections, the usage threshold could be set to a value that will cause one or more dynamic connections to be converted to static connections when the usage on the connection exceeds the usage threshold 262. The user roles 264 can specify different roles for different users. For example, users could be divided into two categories according to role, with one role being a normal user and the second role being an important user. Of course, any suitable number or user roles could be defined. When an important user is using the streaming application, it might make sense to convert based on user roles 264 one or more dynamic connections to static connections, to provide improved performance for important users. Processing deadline 266 could specify a date and time by which processing of the streaming application needs to be completed. For example, some companies required daily processing of data to be completed by midnight each day. When the processing deadline 266 is close, dynamic connections could be converted to static connections to improve the performance of the streaming application, thereby ensuring the processing deadline 266 is met. End user request 268 means a user of the streaming application has explicitly requested conversion of a dynamic connection to a static connection. While specific criteria are shown and discussed above in dynamic to static conversion criteria 260 above, any other suitable criteria that could be used to determine when to convert dynamic connections to static connections, whether currently known or developed in the future.

When the static to dynamic conversion criteria 250 and the dynamic to static conversion criteria 260 are separate criteria shown in FIG. 2, the values can be selected to provide hysteresis that avoids switching back and forth between dynamic and static connections too frequently. For example, a usage threshold of 20,000 tuples per second could be defined as a usage threshold 252, while a separate usage threshold 262 could be set to 30,000 tuples per second. This means when usage (or connection traffic) for a selected connection falls below 20,000 tuples per second, the selected connection can be converted from a static connection to a dynamic connection. Yet once the selected connection is converted to a dynamic connection, the usage for the selected connection must exceed 30,000 tuples per second before the dynamic connection is converted to a static connection. Of course, it is equally within the scope of the disclosure and claims herein to provide a single usage threshold, and when usage on a connection falls below the single usage threshold, converting a static connection to a dynamic connection, and when usage on a connection rises above the single usage threshold, converting a dynamic connection to a static connection. These and other variations are within the scope of the disclosure and claims herein. In addition, instead of having separate static to dynamic conversion criteria 250 and dynamic to static conversion criteria 260, a single set of conversion criteria 240 could be defined that may include any or all of usage threshold, user roles, processing deadline, or other criteria, that apply to conversion of both static to dynamic connections and dynamic to static connections.

Figure 3:
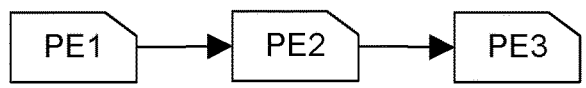
FIG. 3 is a sample portion of a flow graph in a streaming application showing three processing elements.

FIG. 3 shows a sample portion of a flow graph for a streaming application that includes three processing elements PE1, PE2 and PE3, with a connection between PE1 and PE2 and a connection between PE2 and PE3. The sample portion of the flow graph shown in FIG. 3 is used in discussing the flow diagrams in FIGS. 4-7 below.

Figure 4:
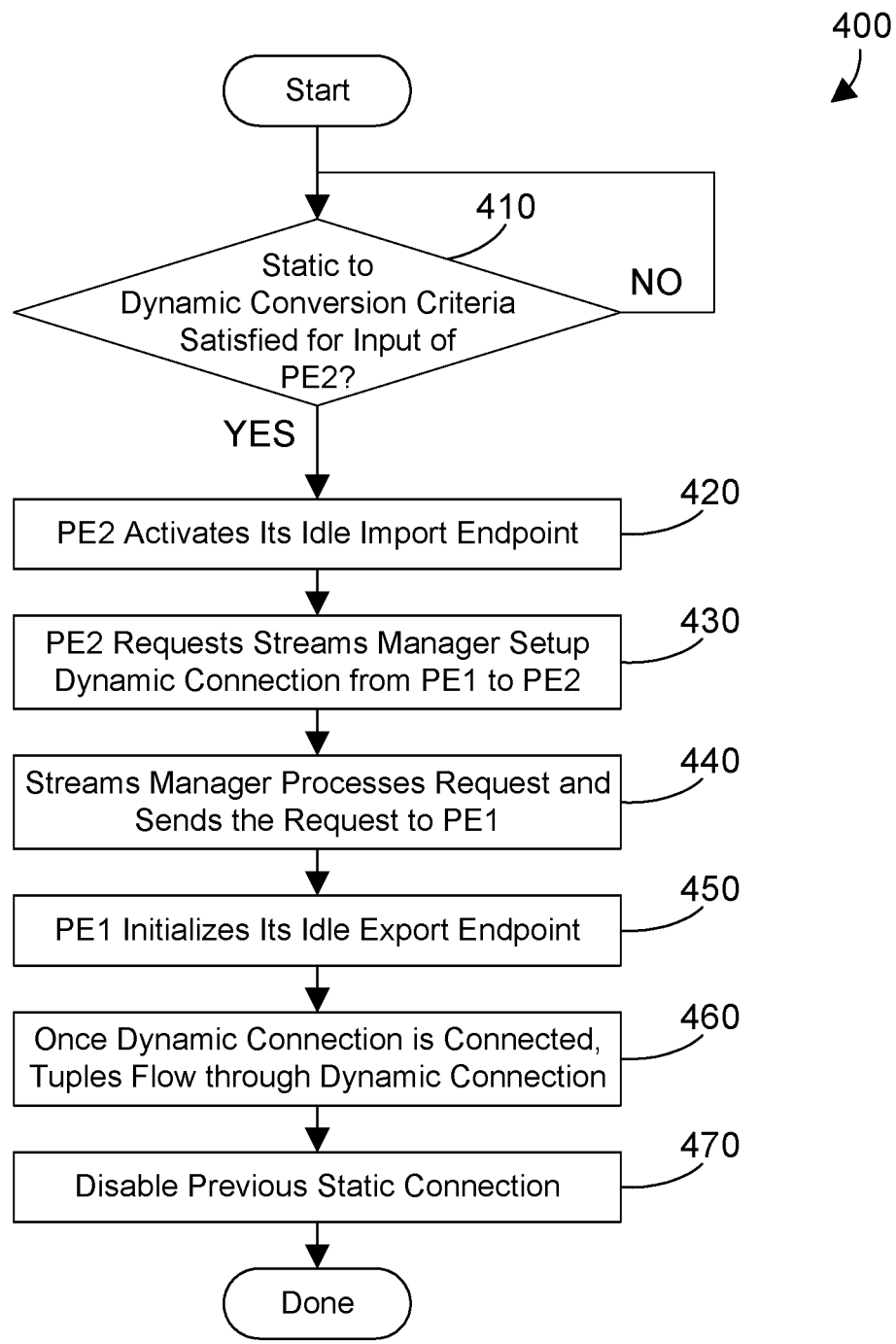
FIG. 4 is a flow diagram of a first method for converting at run-time a static connection in a streaming application to a dynamic connection.

FIG. 4 is a flow diagram of a method 400 that is preferably performed by the connection converter 128 in FIG. 1, and could be performed by the static to dynamic connection converter 220 in FIG. 2. We assume for method 400 in FIG. 4 that the connection between PE1 and PE2 in FIG. 3 is a static connection. When none of the static to dynamic conversion criteria are satisfied for the input of PE2 (step 410=NO), meaning the connection between PE1 and PE2 in FIG. 3, method 400 loops back until one or more of the static conversion criteria are satisfied for the connection on the input of PE2 (step 410=YES). This means the connection from PE1 to PE2 is converted from a static connection to a dynamic connection, using steps 420-470 shown in FIG. 4. PE2 activates its idle import endpoint (step 420). PE2 requests the streams manager setup a dynamic connection from PE1 to PE2 (step 430). The streams manager processes the request and sends the request to PE1 (step 440). In response to the received request, PE1 initializes its idle export endpoint (step 450). Once the dynamic connection from PE1 to PE2 is connected, data tuples flow through the dynamic connection from PE1 to PE2 (step 460), and the previous static connection is disabled (step 470). Method 400 is then done.

Figure 5:
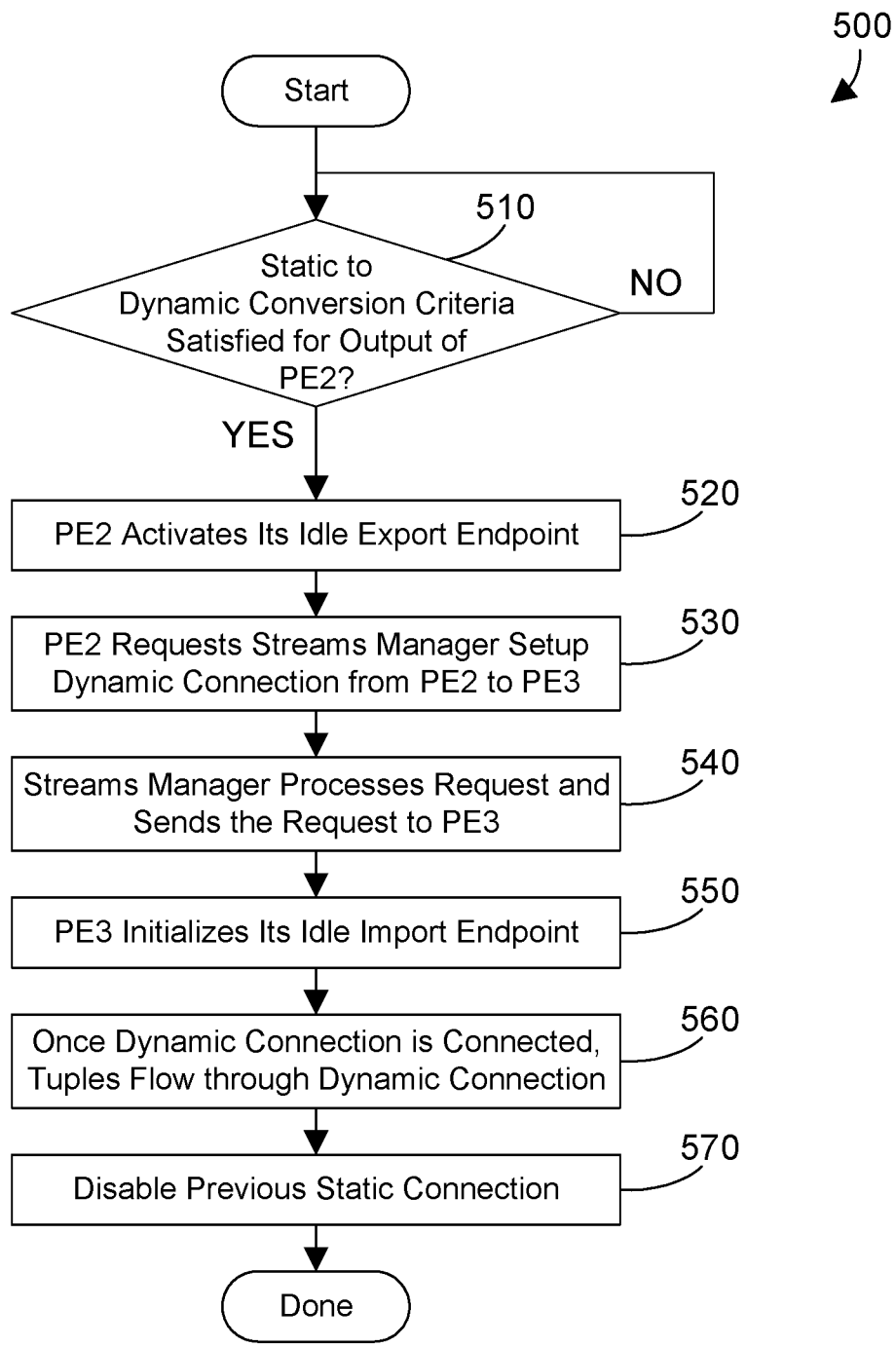
FIG. 5 is a flow diagram of a second method for converting at run-time a static connection in a streaming application to a dynamic connection.

FIG. 5 is a flow diagram of a method 500 that is preferably performed by the connection converter 128 in FIG. 1, and could be performed by the static to dynamic connection converter 220 in FIG. 2. We assume for method 500 in FIG. 5 that the connection between PE2 and PE3 in FIG. 3 is a static connection. When none of the static to dynamic conversion criteria are satisfied for the output of PE2 (step 510=NO), meaning the connection between PE2 and PE3 in FIG. 3, method 500 loops back until one or more of the static conversion criteria are satisfied for the connection on the output of PE2 (step 510=YES). This means the connection from PE2 to PE3 is converted from a static connection to a dynamic connection, using steps 520-570 shown in FIG. 5. PE2 activates its idle export endpoint (step 520). PE2 requests the streams manager setup a dynamic connection from PE2 to PE3 (step 530). The streams manager processes the request and sends the request to PE3 (step 540). In response to the received request, PE3 initializes its idle import endpoint (step 550). Once the dynamic connection from PE2 to PE3 is connected, data tuples flow through the dynamic connection from PE2 to PE3 (step 560), and the previous static connection is disabled (step 570). Method 500 is then done.

Figure 6:
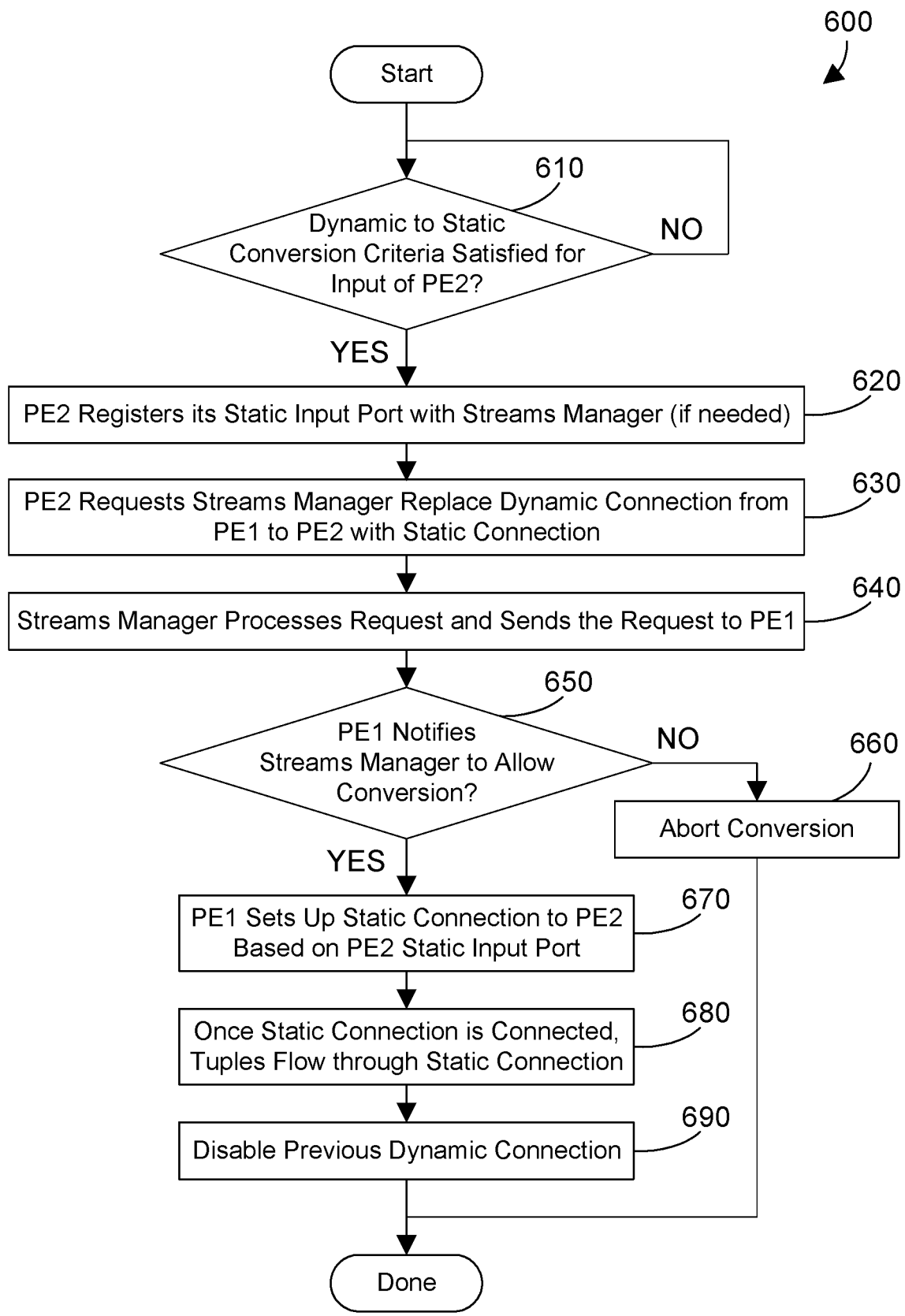
FIG. 6 is a flow diagram of a first method for converting at run-time a dynamic connection in a streaming application to a static connection.

Method 600 in FIG. 6 is a method that is preferably performed by the connection converter 128 in FIG. 1, and could be performed by the dynamic to static connection converter 230 in FIG. 2. We assume for method 600 in FIG. 6 that the connection between PE1 and PE2 in FIG. 3 is a dynamic connection. When none of the dynamic to static conversion criteria for the connection on the input of PE2 are satisfied (step 610=NO), meaning the connection between PE1 and PE2 in FIG. 3, method 600 loops back until one or more of the dynamic to static conversion criteria for the connection at the input of PE2 are satisfied (step 610=YES). PE2 then requests the streams manager replace the dynamic connection from PE1 to PE2 with a static connection, using steps 620-690 shown in FIG. 6. PE2 registers its static input port with the streams manager, if needed (step 620). If PE2 had previously registered its static input port with the streams manager, it will not need to do so again. PE2 requests the stream manager replace the dynamic connection from PE1 to PE2 with a static connection (step 630). The streams manager processes the request and sends the request to PE1 (step 640). If PE1 does not notify the streams manager to allow conversion (step 650=NO), the conversion is aborted (step 660), and method 600 is done. When PE1 notifies the streams manager to allow the conversion (step 650=YES), PE1 sets up a static connection to PE2 based on the PE2 static input port (step 670). Once the static connection is connected, data tuples flow through the static connection from PE1 to PE2 (step 680), and the previous dynamic connection is disabled (step 690). Method 600 is then done.

Figure 7:
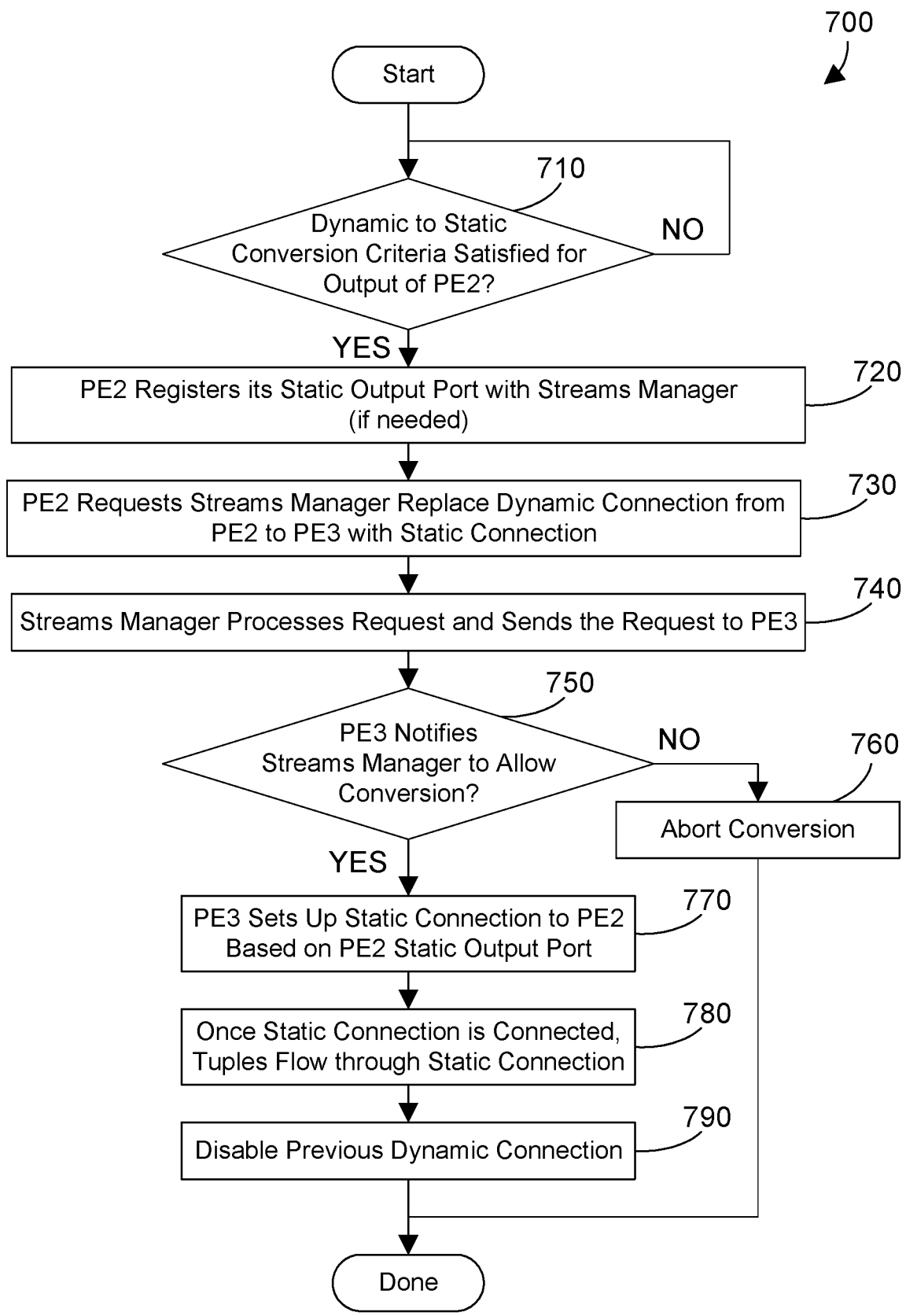
FIG. 7 is a flow diagram of a second method for converting at run-time a dynamic connection in a streaming application to a static connection.

Method 700 in FIG. 7 is a method that is preferably performed by the connection converter 128 in FIG. 1, and could be performed by the dynamic to static connection converter 230 in FIG. 2. We assume for method 700 in FIG. 7 that the connection between PE2 and PE3 in FIG. 3 is a dynamic connection. When none of the dynamic to static conversion criteria for the connection on the output of PE2 are satisfied (step 710=NO), meaning the connection between PE2 and PE3 in FIG. 3, method 700 loops back until one or more of the dynamic to static conversion criteria for the connection at the output of PE2 are satisfied (step 710=YES). PE2 then requests the streams manager replace the dynamic connection from PE2 to PE3 with a static connection, using steps 720-790 shown in FIG. 7. PE2 registers its static output port with the streams manager, if needed (step 720). PE2 requests the stream manager replace the dynamic connection from PE2 to PE3 with a static connection (step 730). The streams manager processes the request and sends the request to PE3 (step 740). If PE3 does not notify the streams manager to allow conversion (step 750=NO), the conversion is aborted (step 760), and method 700 is done. When PE3 notifies the streams manager to allow the conversion (step 750=YES), PE3 sets up a static connection to PE2 based on the PE2 static output port (step 770). Once the static connection is connected, data tuples flow through the static connection from PE2 to PE3 (step 780), and the previous dynamic connection is disabled (step 790). Method 700 is then done.

Figure 8:
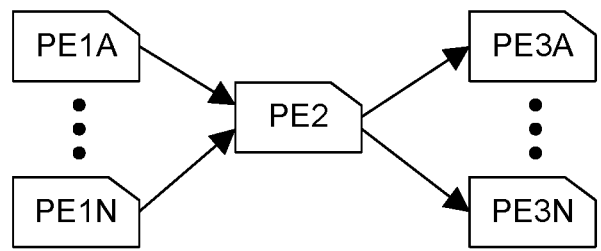
FIG. 8 is a sample portion of a flow graph in a streaming application showing many processing elements.

The methods in FIGS. 4-7 assume single processing elements with single connections, as shown in FIG. 3. In an alternative embodiment, a processing element may have multiple connections to multiple processing elements on its input, and may have multiple connections to multiple processing elements on its output. Referring to FIG. 8, a portion of a flow diagram is shown with a processing element PE2 that has multiple processing elements, shown in FIG. 8 as PE1A, . . . , PE1N, that send data tuples on different connections to PE2. PE2 outputs data tuples on different connections to multiple processing elements, shown as PE3A, . . . , PE3N. The presence of multiple processing elements on the input of PE2 and multiple processing elements on the output of PE2 require some additional steps. The methods for converting connections in a configuration as shown in FIG. 8 are shown in FIGS. 9-12.

Figure 9:
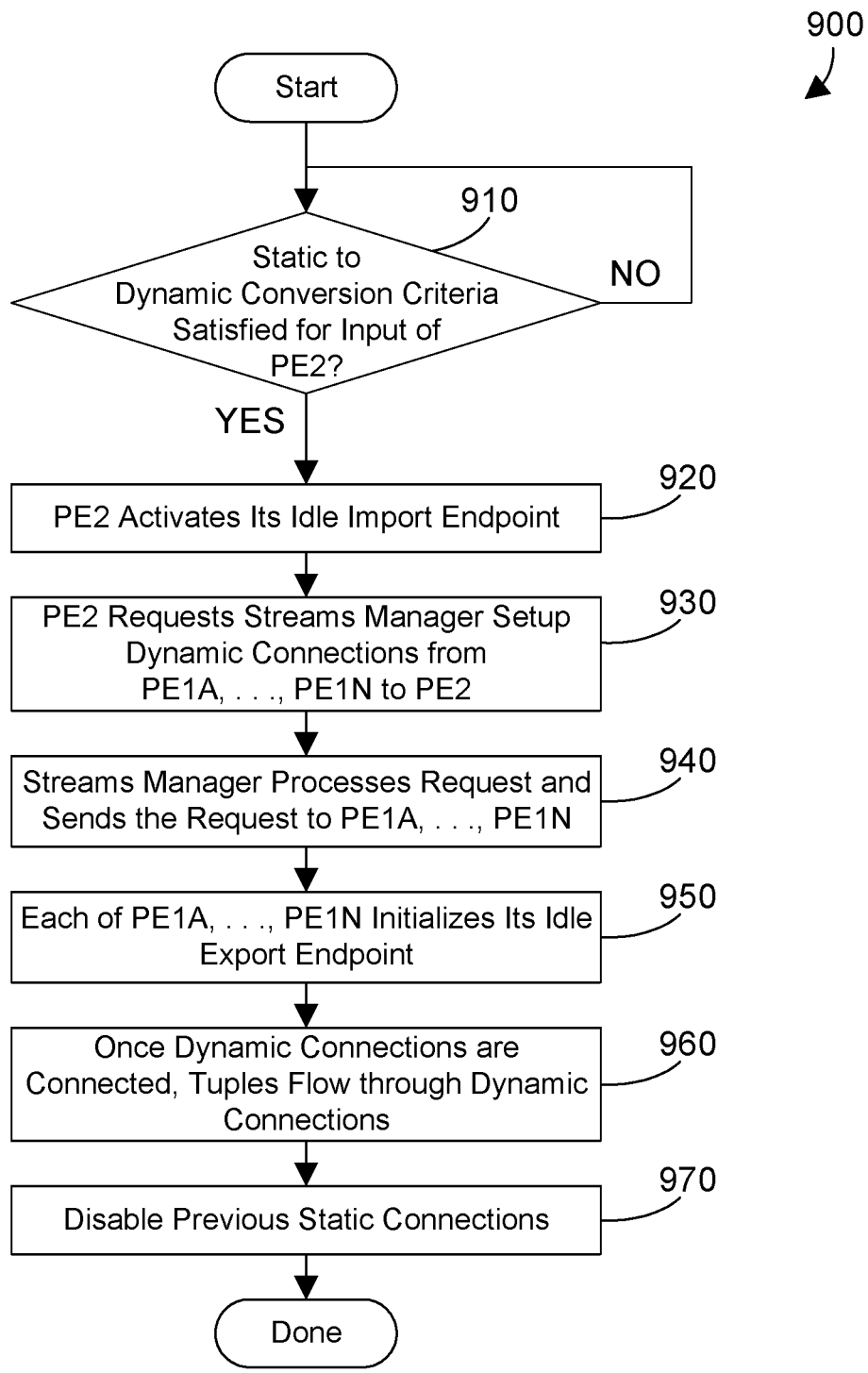
FIG. 9 is a flow diagram of a first method for converting at run-time multiple static connections in a streaming application to dynamic connections.

FIG. 9 is a flow diagram of a method 900 that is preferably performed by the connection converter 128 in FIG. 1, and could be performed by the static to dynamic connection converter 220 in FIG. 2. We assume for method 900 in FIG. 9 that all of the connections between PE1A, . . . , PE1N and PE2 in FIG. 3 are static connections. When none of the static to dynamic conversion criteria are satisfied for any of the connections on the input of PE2 (step 910=NO), method 900 loops back until one or more of the static conversion criteria are satisfied for the connections on the input of PE2 (step 910=YES). We assume for this example all of the connections from PE1A, . . . , PE1N to PE2 satisfy the static to dynamic conversion criteria. This means the connections from PE1A, . . . , PE1N to PE2 are converted from static connections to dynamic connections, using steps 920-970 shown in FIG. 9. PE2 activates its idle import endpoint (step 920). PE2 requests the streams manager setup a dynamic connection from each of PE1A, . . . , PE1N to PE2 (step 930). The streams manager processes the request and sends the request to all of PE1A, . . . , PE1N (step 940). In response to the received request, each of PE1A, . . . , PE1N initializes its idle export endpoint (step 950). Once the dynamic connections from PE1A, . . . , PE1N to PE2 are connected, data tuples flow through the dynamic connections from PE1A, . . . , PE1N to PE2 (step 960), and the previous static connections are disabled (step 970). Method 900 is then done.

While method 900 in FIG. 9 is discussed in terms of converting all of the connections between PE1A, . . . , PE1N to PE2, it is equally within the scope of the disclosure and claims herein to convert less than all of the connections between PE1A, . . . , PE1N to PE2. Thus, if there are a total of five connections from five processing elements to the input of PE2, and if two of the five satisfy the static to dynamic conversion criteria in step 910, the two connections that satisfy the static to dynamic conversion criteria in step 910 can be converted to dynamic connections, while the remaining three can remain static connections. This shows the great flexibility of the connection converter herein because it has the ability to dynamically change any suitable number of connections to a different type of connection, as needed, while the application executes.

Figure 10:
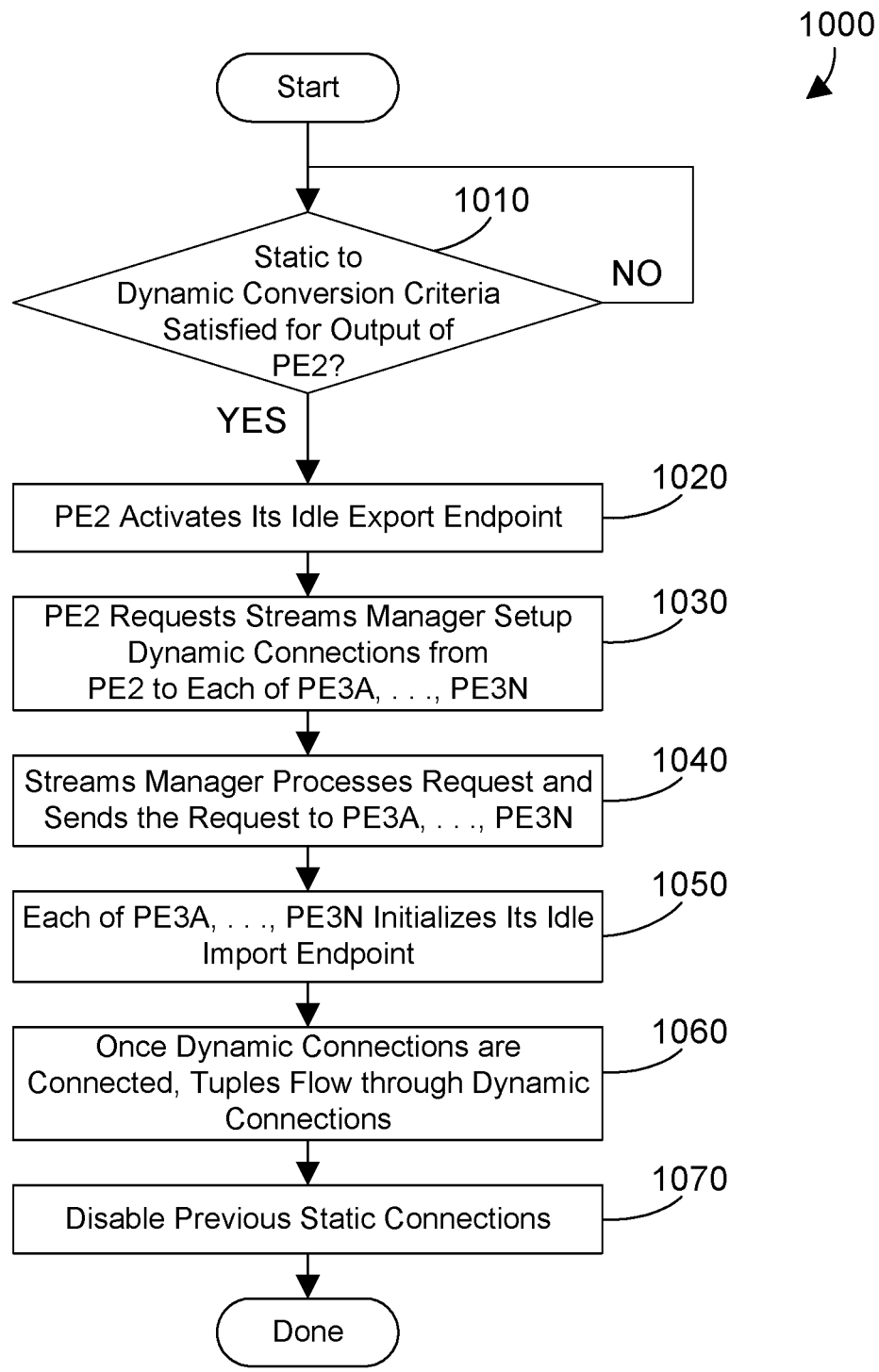
FIG. 10 is a flow diagram of a second method for converting at run-time multiple static connections in a streaming application to dynamic connections.

FIG. 10 is a flow diagram of a method 1000 that is preferably performed by the connection converter 128 in FIG. 1, and could be performed by the static to dynamic connection converter 220 in FIG. 2. We assume for method 1000 in FIG. 10 that the connections between PE2 and PE3A, . . . , PE3N in FIG. 8 are static connections. When none of the static to dynamic conversion criteria are satisfied for any of the connections connected to the output of PE2 (step 1010=NO), meaning the connections between PE2 and PE3A, . . . , PE3N in FIG. 3, method 1000 loops back until one or more of the static to dynamic conversion criteria are satisfied for one or more of the connections on the output of PE2 (step 1010=YES). We assume for this example all of the connections from the output of PE2 to PE3A, . . . , PE3N satisfy the static to dynamic conversion criteria. This means all of the connections from PE2 to PE3A, . . . , PE3N are converted from static connections to dynamic connections, using steps 1020-1070 shown in FIG. 10. PE2 activates its idle export endpoint (step 1020). PE2 requests the streams manager setup dynamic connections from PE2 to each of PE3A, . . . , PE3N (step 1030). The streams manager processes the request and sends the request to each of PE3A, . . . , PE3N (step 1040). In response to the received request, each of PE3A, . . . , PE3N initializes its idle import endpoint (step 1050). Once the dynamic connections from PE2 to PE3A, . . . , PE3N are connected, data tuples flow through the dynamic connections from PE2 to PE3A, . . . , PE3N (step 1060), and the previous static connections are disabled (step 1070). Method 1000 is then done.

While method 1000 in FIG. 10 is discussed in terms of converting all of the connections between PE2 to PE3A, . . . , PE3N, it is equally within the scope of the disclosure and claims herein to convert less than all of the connections between PE2 and PE3A, . . . , PE3N. Thus, if there are a total of five connections from the output of PE2 to five processing elements, and if three of the five satisfy the static to dynamic conversion criteria in step 1010, the three connections that satisfy the static to dynamic conversion criteria in step 1010 can be converted to dynamic connections, while the remaining two can remain static connections. This shows the great flexibility of the connection converter herein because it has the ability to dynamically change any suitable number of connections to a different type of connection, as needed, while the application executes.

Figure 11:
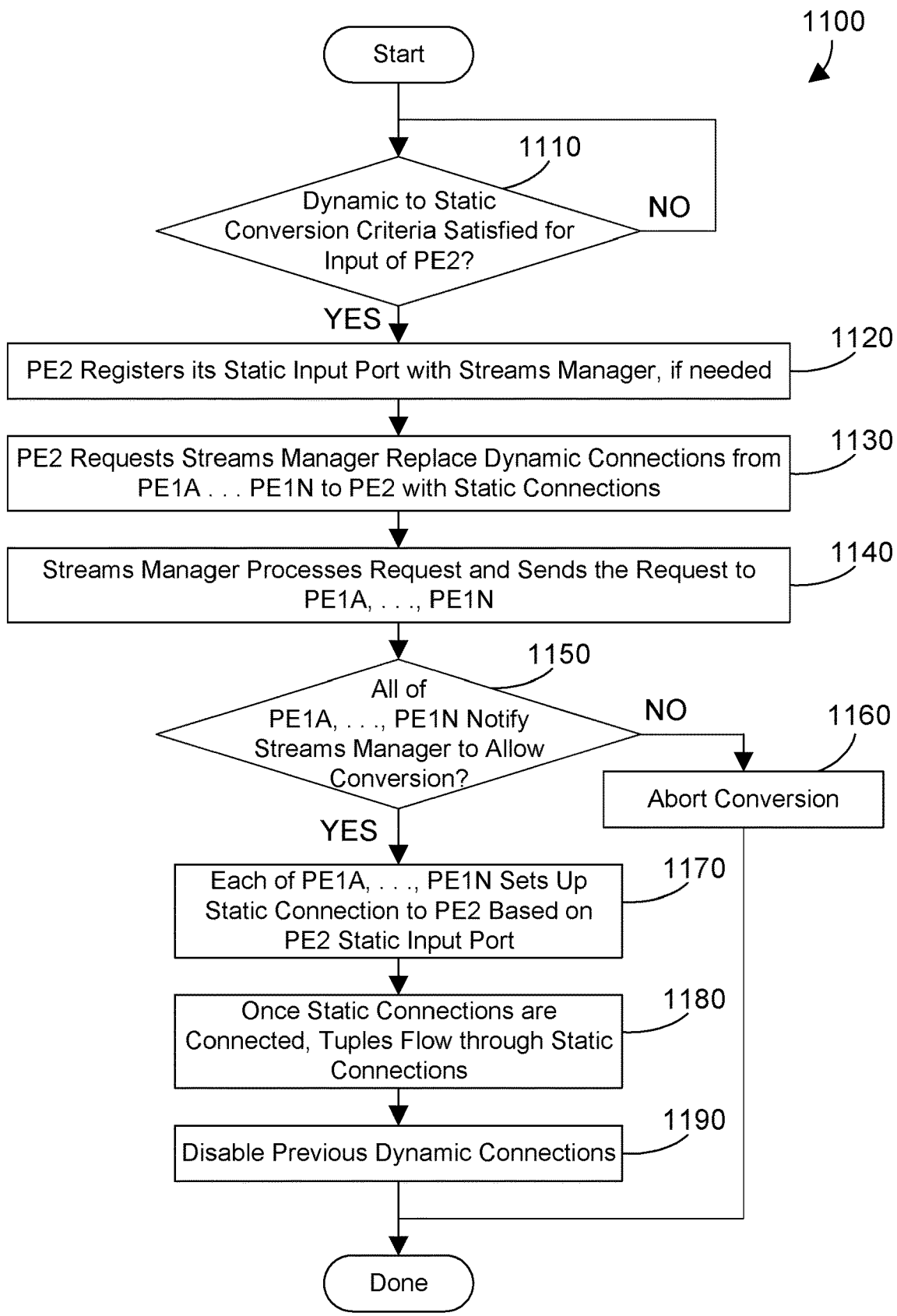
FIG. 11 is a flow diagram of a first method for converting at run-time multiple dynamic connections in a streaming application to static connections.

Method 1100 in FIG. 11 is a method that is preferably performed by the connection converter 128 in FIG. 1, and could be performed by the dynamic to static connection converter 230 in FIG. 2. We assume for method 1100 in FIG. 11 that the connections between PE1A, . . . , PE1N and PE2 in FIG. 8 are dynamic connections. When none of the dynamic to static conversion criteria for the connections on the input of PE2 are satisfied (step 1010=NO), meaning the connection between PE1A, . . . , PE1N and PE2 in FIG. 8, method 1100 loops back until one or more of the dynamic to static conversion criteria for the connections at the input of PE2 are satisfied (step 1110=YES). We assume for this example all of the connections from PE1A, . . . , PE1N to PE2 satisfy the dynamic to static conversion criteria. PE2 then requests the streams manager replace the dynamic connections from PE1A, . . . , PE1N to PE2 with static connections, using steps 1120-1190 shown in FIG. 11. PE2 registers its static input port with the streams manager, if needed (step 1120). PE2 requests the stream manager replace the dynamic connections from PE1A, . . . , PE1N to PE2 with static connections (step 1130). The streams manager processes the request and sends the requests to all of PE1A, . . . , PE1N (step 1140). If any of PE1A, . . . , PE1N does not notify the streams manager to allow conversion (step 1150=NO), the conversion is aborted (step 1160), and method 1100 is done. When all of PE1A, . . . , PE1N notify the streams manager to allow the conversion (step 1150=YES), each of PE1A, . . . , PE1N sets up a static connection to PE2 based on the PE2 static input port (step 1170). Once the static connections are connected, data tuples flow through the static connections from PE1A, . . . , PE1N to PE2 (step 1180), and the previous dynamic connections are disabled (step 1190). Method 1100 is then done.

While method 1100 in FIG. 11 is discussed in terms of converting all of the connections between PE1A, . . . , PE1N to PE2, it is equally within the scope of the disclosure and claims herein to convert less than all of the connections between PE1A, . . . , PE1N to PE2. Thus, if there are a total of seven connections to the input of PE2 from seven processing elements, and if five of the seven satisfy the dynamic to static conversion criteria in step 1110, the five connections that satisfy the dynamic to static conversion criteria in step 1110 can be converted to static connections, while the remaining two can remain dynamic connections. This shows the great flexibility of the connection converter herein because it has the ability to dynamically change any suitable number of connections to a different type of connection, as needed, while the application executes.

Figure 12:
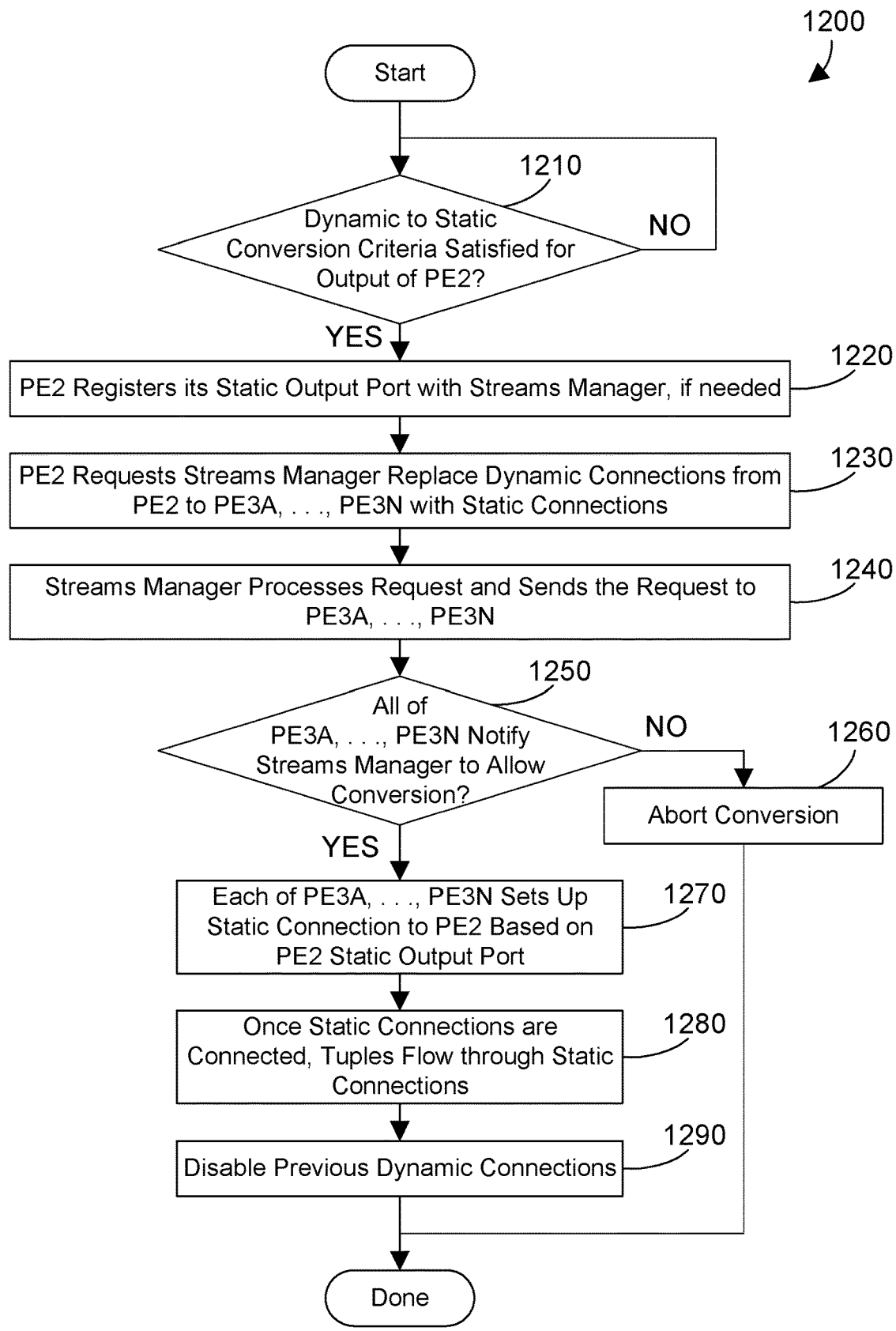
FIG. 12 is a flow diagram of a second method for converting at run-time multiple dynamic connections in a streaming application to static connections.

Method 1200 in FIG. 12 is a method that is preferably performed by the connection converter 128 in FIG. 1, and could be performed by the dynamic to static connection converter 230 in FIG. 2. We assume for method 1200 in FIG. 12 that the connections between PE2 and PE3A, . . . , PE3N in FIG. 8 are dynamic connections. When none of the dynamic to static conversion criteria for the connections on the output of PE2 are satisfied (step 1210=NO), meaning the connections between PE2 and PE3A, . . . , PE3N in FIG. 8, method 1200 loops back until one or more of the dynamic to static conversion criteria for the connections at the output of PE2 are satisfied (step 1210=YES). We assume for this example all of the connections from PE2 to PE3A, . . . , PE3N satisfy the dynamic to static conversion criteria. PE2 then requests the streams manager replace the dynamic connections from PE2 to PE3A, . . . , PE3N with static connections, using steps 1220-1290 shown in FIG. 12. PE2 registers its static output port with the streams manager, if needed (step 1220). PE2 requests the streams manager replace the dynamic connection from PE2 to PE3A, . . . , PE3N with static connections (step 1230). The streams manager processes the request and sends the request to each of PE3A, . . . , PE3N (step 1240). If any of PE3A, . . . , PE3N does not notify the streams manager to allow conversion (step 1250=NO), the conversion is aborted (step 1260), and method 1200 is done. When all of PE3A, . . . , PE3N notify the streams manager to allow the conversion (step 1250=YES), each of PE3A, . . . , PE3N sets up a static connection to PE2 based on the PE2 static output port (step 1270). Once the static connections are connected, data tuples flow through the static connections from PE2 to PE3A, . . . , PE3N (step 1280), and the previous dynamic connections are disabled (step 1290). Method 1200 is then done.

While method 1200 in FIG. 12 is discussed in terms of converting all of the connections between PE2 and PE3A, . . . , PE3N, it is equally within the scope of the disclosure and claims herein to convert less than all of the connections between PE2 and PE3A, . . . , PE3N. Thus, if there are a total of four connections from the output of PE2 to four processing elements, and if three of the four satisfy the dynamic to static conversion criteria in step 1210, the three connections that satisfy the dynamic to static conversion criteria in step 1210 can be converted to static connections, while the remaining one can remain a dynamic connection. This shows the great flexibility of the connection converter herein because it has the ability to dynamically change any suitable number of connections to a different type of connection, as needed, while the application executes.

Figure 13:
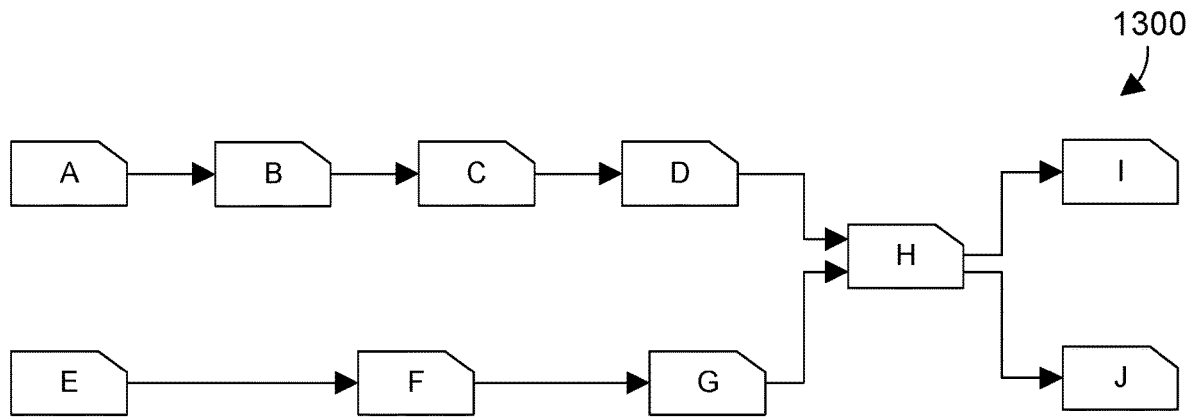
FIG. 13 is a sample flow graph of a simple streaming application.

A simple example is now provided to more specifically illustrate some of the concepts discussed generally above. Referring to FIG. 13, an extremely simplified streaming application 1300 is shown for the purposes of illustrating the concepts herein. The streaming application 1300 includes ten processing elements A, B, C, D, E, F, G, H, I and J that have static connections as shown. Processing element A produces data tuples that are sent to processing element B. Processing element B operates on the data tuples received from processing element A and sends the resulting data tuples to processing element C. Processing element C operates on the data tuples received from processing element B and sends the resulting data tuples to processing element D. In similar fashion, processing element E produces data tuples that are sent to processing element F, which processes those data tuples and sends resulting data tuples to processing element G. Processing elements D and G both send their data tuples to processing element H, which processes these data tuples and sends some data tuples to processing element I and other data tuples to processing element J.

Figure 14:
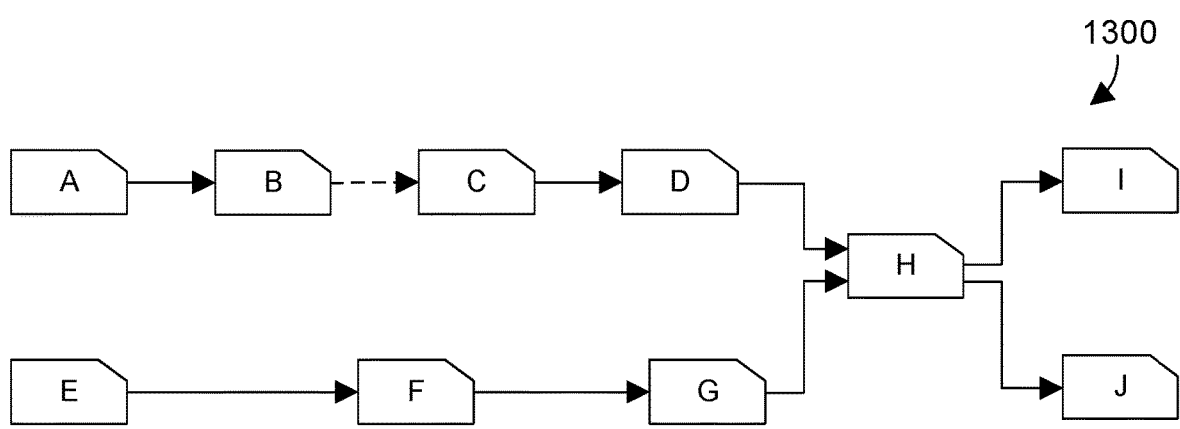
FIG. 14 is the flow graph of FIG. 13 after converting the static connection between B and C to a dynamic connection.

We assume all of the connections between processing elements shown in FIG. 13 are static connections represented by the arrows with solid lines, and these static connections are thus present when the streaming application 1300 begins execution. We now assume a static to dynamic conversion criteria of 2,000 tuples per second is defined, which means any static connection that drops to below 2,000 tuples per second can be dynamically converted to a dynamic connection. We assume for this example the connection from processing element B to processing element C drops to less than 2,000 tuples per second. As a result, the connection converter can run method 400 in FIG. 4, with C representing PE2 and B representing PE1, to convert the connection from B to C from a static connection to a dynamic connection. The result is shown in FIG. 14, where the connection between processing elements B and C is now represented by an arrow with a dotted line, representing a dynamic connection.

Next we assume the connection between processing elements E and F drops to less than 2,000 tuples per second. As a result, the connection converter can run method 500 in FIG. 5, with E representing PE2 and F representing PE3, to convert the connection from E to F from a static connection to a dynamic connection. The result is shown in FIG. 15, where the connection between processing elements E and F is now represented by an arrow with a dotted line, representing a dynamic connection.

Figure 15:
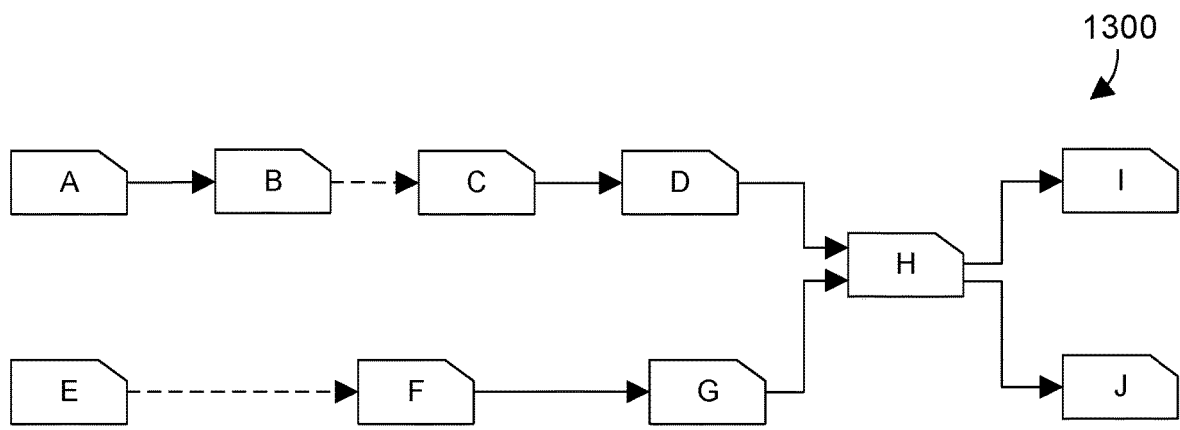
FIG. 15 is the flow graph of FIG. 14 after converting the static connection between E and F to a dynamic connection.
Figure 16:
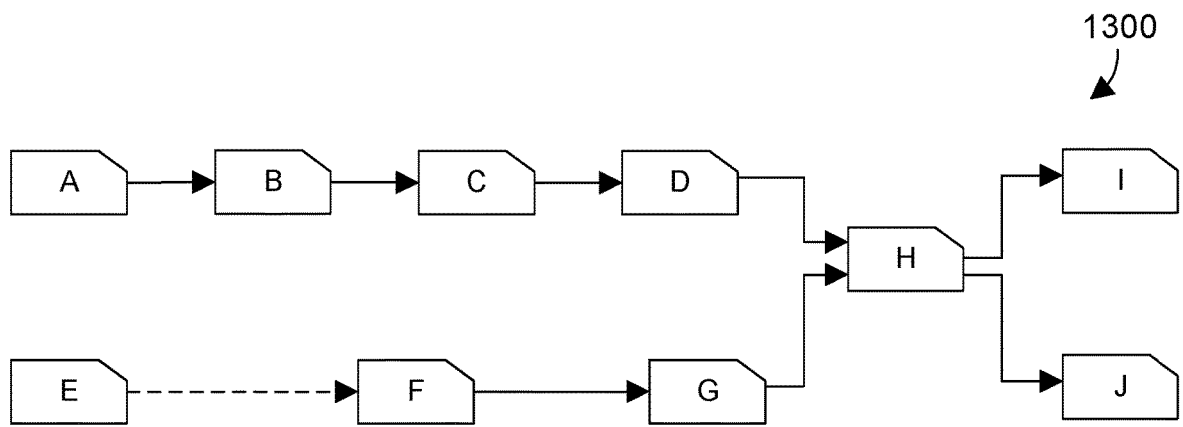
FIG. 16 is the flow graph of FIG. 15 after converting the dynamic connection between B and C to a static connection.

Next we assume an important user uses the streaming application 1300, and the user role of an important user creates the need to convert the dynamic connections in FIG. 15 to static connections. This means the dynamic connection between B and C shown in FIGS. 14 and 15 needs to be converted back to a static connection. The connection converter can then run method 600 in FIG. 6, with C representing PE2 and B representing PE1. The result is as shown in FIG. 16, where the connection between B and C is again an arrow with a solid line, indicating a static connection. The dynamic connection between E and F also needs to be converted back to a static connection. The connection converter can run method 600 in FIG. 6, with F representing PE2 and E representing PE1. The result is as shown in FIG. 13, where all of the dynamic connections have been converted back to static connections based on the important user using the streaming application.

Figure 17:
FIG. 17 is the flow graph of FIG. 13 after converting the static connections between E and H and between G and H to dynamic connections.

Next we assume the static connection between processing elements D and H and the static connection between processing elements G and H both fall to less than 2,000 tuples per second, and the static to dynamic conversion criteria with a threshold of 2,000 tuples per second is defined, which means any static connection that drops to less than 2,000 tuples per second can be dynamically converted to a dynamic connection. This means the static connections between D and H and between G and H shown in FIG. 16 need to be converted to dynamic connections. The connection converter can then run method 900 in FIG. 9, with H representing PE2 and D and G representing PE1A and PE1N. The result is as shown in FIG. 17, where the connections between D and H and between G and H are dotted lines, indicating dynamic connections.

Figure 18:
FIG. 18 is the flow graph of FIG. 17 after converting the static connections between H and I and between H and J to dynamic connections.

Next we assume the static connection between processing element H and I and the static connection between processing elements H and J both fall to less than 2,000 tuples per second. This means the static connections between H and I and between H and J shown in FIG. 17 need to be converted to dynamic connections. The connection converter can then run method 1000 in FIG. 9, with H representing PE2 and I and J representing PE3A and PE3N. The result is as shown in FIG. 18, where the connections between H and I and between H and J are dotted lines, indicating dynamic connections.

Figure 19:
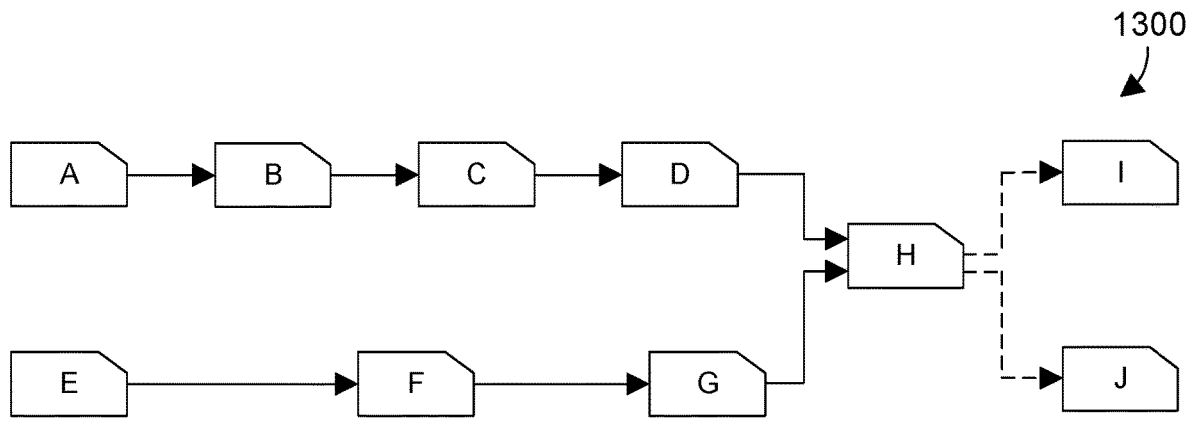
FIG. 19 is the flow graph of FIG. 18 after converting the dynamic connections between D and H and between G and H to static connections.

Next we assume a processing deadline of midnight is specified, and the current time is close enough to midnight that acceleration of the performance of the streaming application 1300 is needed. This means the dynamic connections between D and H, between G and H, between H and I, and between H and J shown in FIG. 18 need to be converted back to static connections. The connection converter can then run method 1100 in FIG. 11, with H representing PE2 and D and G representing PE1A and PE1N. The result is as shown in FIG. 19, where the connections between D and H and between G and H are again arrows with solid lines, indicating static connections. The dynamic connections between H and I and between H and J in FIG. 19 also need to be converted to static connections. The connection converter can run method 1200 in FIG. 12, with H representing PE2 and I and J representing PE3A and PE3N. The result is as shown in FIG. 13, where the connections between H and I and between H and J are again arrows with solid lines, indicating static connections.

Figure 20:
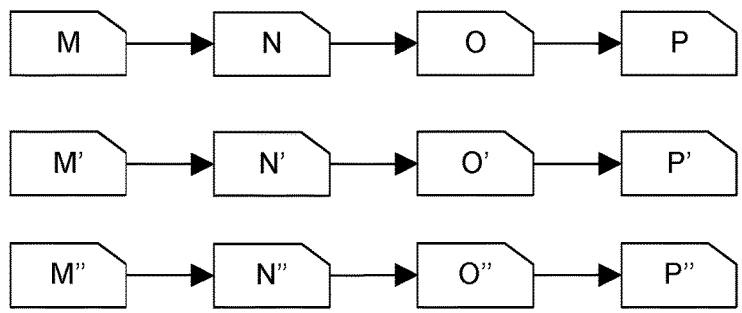
FIG. 20 shows flow graphs of three instances of a streaming application.
Figure 21:
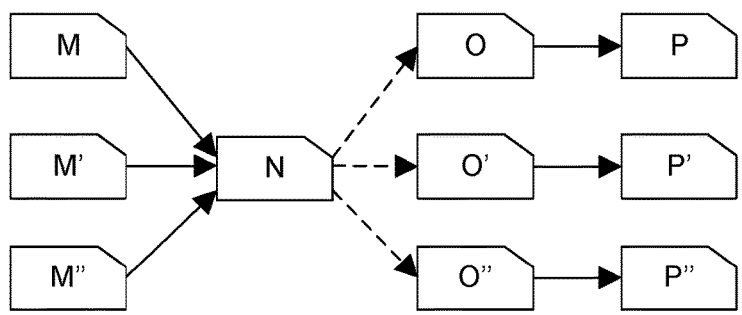
FIG. 21 shows flow graphs of the three instance of the streaming application in FIG. 20 after replacing three instances of processing element N with one instance and converting some of the static connections to dynamic connections.

FIGS. 20 and 21 show how multiple instances of a processing element can be replaced with a single instance of the processing element and dynamic connections. We assume for this example a portion of a streaming application includes the processing elements M, N, O and P as shown at the top of FIG. 20. We further assume multiple instances of this application are running, as indicated by the similar processing elements M', N', O' and P', and M", N", O" and P", as shown in FIG. 20. We assume all connections between processing elements in FIG. 20 are static connections, as indicated by the arrows with solid lines. These connections provide high performance, but the resource cost is high because each instance of the application includes separate instances of the processing elements.

One of the static to dynamic conversion criteria 250 shown in FIG. 2 is duplicate processing elements 259. Let's assume for the example in FIGS. 20 and 21 the duplicate processing elements criteria 259 indicates that once there are three instances of a processing element that uses significant resources, these three processing elements can be replaced by a single processing element that includes dynamic connections. For the example in FIG. 20 we assume processing element N uses significant resources. Note that any suitable threshold or criteria could be defined that determines when a processing element uses significant resources. Because processing element N uses significant resources, it would be beneficial to replace the three instances of N, namely N, N' and N" in FIG. 20, with a single instance. Referring to FIG. 21, we assume when the third instance in FIG. 20 M", N", O" and P" begins running, with the duplicate instances criteria 259 having a value of three, the creation of the third instance N" will cause the static to dynamic connection converter to convert the three instances of N, N' and N" into a single instance N, with dynamic connections to the instances of O, O' and O", as shown in FIG. 21. This simple example shows how dynamically converting connections as a streaming application executes can improve performance and resource usage of the streaming application.

Figure 22:
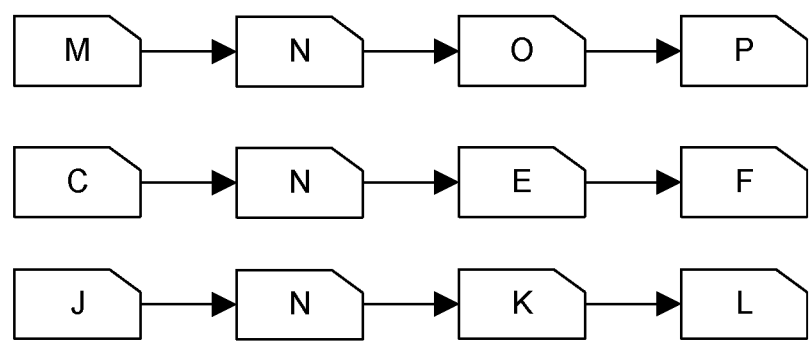
FIG. 22 shows flow graphs of three different streaming applications.
Figure 23:
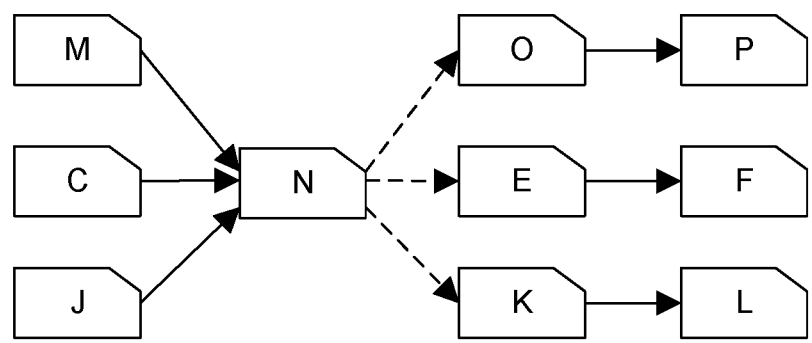
FIG. 23 shows the three different streaming applications using a common processing element by converting some of the static connections to dynamic connections.

Another example shown in FIGS. 22 and 23 illustrates a similar principle when there are duplicate processing elements across multiple streaming applications. FIG. 22 shows three different streaming applications. The top streaming application in FIG. 22 includes processing elements M, N, O and P. The middle streaming application in FIG. 22 includes processing elements C, N, E and F. The bottom streaming application in FIG. 22 includes processing elements J, N, K and L. We see that each of these streaming applications includes processing element N. Assuming the duplicate instances criteria 259 has a value of three, once the third streaming application starts running, the static to dynamic connection converter will convert the connections to three instances of the N processing element to instead connect to a single processing element N, as shown in FIG. 23, and will convert the static connections from N to processing elements O, E and K to dynamic connections, as indicated by the arrows with the dotted lines in FIG. 23. The different between the example in FIGS. 20 and 21 and the example in FIGS. 22 and 23 is that FIGS. 20 and 21 includes multiple instances of a streaming application, while FIGS. 22 and 23 include multiple different streaming applications that include the same processing element.

The examples above are extremely simplified to illustrate the general concepts herein. One skilled in the art will appreciate that many variations are possible within the scope of the disclosure and claims herein. In the discussion herein, data tuples are sometimes referred to as data tuples, and at other times are referred to as tuples. These are deemed to be equivalent terms, as the tuples discussed herein are data tuples in a streaming application.

The disclosure and claims herein support an apparatus comprising: at least one processor; a memory coupled to the at least one processor; a streams manager residing in the memory and executed by the at least one processor, the streams manager executing a streaming application that comprises a flow graph that comprises: a plurality of processing elements; a plurality of static connections between the plurality of processing elements; and at least one dynamic connection between the plurality of processing elements, wherein the at least one dynamic connection is created as the streaming application is executed by the streams manager; a connection converter residing in the memory and executed by the at least one processor, wherein the connection converter monitors conversion criteria for converting static connections to dynamic connections, and when at least one of the conversion criteria for converting static connections to dynamic connections is satisfied, the connection converter converts during execution of the streaming application at least one static connection in the streaming application to a corresponding dynamic connection.

The disclosure and claims herein additionally support a computer-implemented method executed by at least one processor for converting connections in a streaming application, the method comprising: a streams manager executing a streaming application that comprises a flow graph that comprises: a plurality of processing elements; a plurality of static connections between the plurality of processing elements; and at least one dynamic connection between the plurality of processing elements, wherein the at least one dynamic connection is created as the streaming application is executed by the streams manager; monitoring conversion criteria for converting static connections to dynamic connections; and when at least one of the conversion criteria for converting static connections to dynamic connections is satisfied, converting during execution of the streaming application at least one static connection in the streaming application to a corresponding dynamic connection.

The disclosure and claims herein further support a computer-implemented method executed by at least one processor for converting connections in a streaming application, the method comprising: a streams manager executing a streaming application that comprises a flow graph that comprises: a plurality of processing elements; a plurality of static connections between the plurality of processing elements; and at least one dynamic connection between the plurality of processing elements, wherein the at least one dynamic connection is created as the streaming application is executed by the streams manager; monitoring conversion criteria for converting static connections to dynamic connections, wherein the conversion criteria for converting dynamic connections to static connections comprises a first usage threshold that specifies a first data tuple threshold rate; when a rate of data tuples on a selected static connection between first and second processing elements is less than the first usage threshold, converting during execution of the streaming application the first static connection between the first and second processing elements in the streaming application to a corresponding dynamic connection by: the second processing element activating an idle import endpoint in the second processing element; the second processing element requesting the streams manager setup a dynamic connection from the first processing element to the second processing element; the streams manager processes the request from the second processing element and sending the request to the first processing element; in response to receiving the request, the first processing element initializes an idle export endpoint in the first processing element; once the streams manager connects the dynamic connection between the first processing element and the second processing element, tuples flow from the first processing element through the dynamic connection to the second processing element; and disabling the static connection between the first processing element and the second processing element; monitoring conversion criteria for converting dynamic connections to static connections, wherein the conversion criteria for converting dynamic connections to static connections comprises a second usage threshold that specifies a second data tuple threshold rate; when a rate of data tuples on a selected dynamic connection between the third and fourth processing elements is greater than the second usage threshold, converting during execution of the streaming application the first dynamic connection between the third and fourth processing elements in the streaming application to a corresponding static connection by: the fourth processing element registering a static input port of the fourth processing element with the streams manager; the fourth processing element requesting the streams manager to replace the dynamic connection from the third processing element to the fourth processing element with a static connection; the streams manager processing the request from the fourth processing element and sending the request to the third processing element; when the third processing element does not notify the streams manager to allow conversion of the first dynamic connection, aborting the conversion of the first dynamic connection; and when the third processing element notifies the streams manager to allow conversion of the first dynamic connection: the third processing element sets up a static connection to the fourth processing element based on the static input port of the fourth processing element; once the streams manager connects the static connection between the third processing element and the fourth processing element, tuples flow from the third processing element through the static connection to the fourth processing element; and disabling the dynamic connection between the third processing element and the fourth processing element.

A streams manager includes a connection converter that allows converting at run-time a static connection to a dynamic connection, and converting at run-time a dynamic connection to a static connection. One or more conversion criteria are defined that determine when a conversion of one or more connections is needed at run-time. When conversion criteria for converting a static connection from a first processing element to a second processing element to a dynamic connection is satisfied, the first processing element interacts with the streams manager and with the second processing element to dynamically change the static connection to a dynamic connection. When conversion criteria for converting a dynamic connection from a first processing element to a second processing element to a static connection is satisfied, the first processing element interacts with the streams manager and with the second processing element to dynamically change the dynamic connection to a static connection. The conversion criteria may include a usage threshold, a user role, a processing deadline, or other criteria.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a streams manager residing in the memory and executed by the at least one processor, the streams manager executing a streaming application that comprises a flow graph that comprises:
   a plurality of processing elements; and
   a plurality of static connections between the plurality of processing elements;
a connection converter residing in the memory and executed by the at least one processor, wherein the connection converter:
   monitors conversion criteria for converting static connections to dynamic connections;
   determines that the conversion criteria is satisfied for a connection between two processing elements, wherein the static connection is a connection between processing elements that is defined at compile-time; and
   responsive to determining that the conversion criteria is satisfied, converts, during execution of the streaming application, the static connection between the two processing elements to a dynamic connection between the two processing elements, wherein the dynamic connection is a connection between the two processing elements that can be dynamically created as the streaming application runs.

2. The apparatus of claim 1 wherein:
the flow graph further comprises at least one dynamic connection between the plurality of processing elements;
the at least one dynamic connection is created as the streaming application is executed by the streams manager;
the connection converter monitors conversion criteria for converting dynamic connections to static connections; and
when at least one of the conversion criteria for converting dynamic connections to static connections is satisfied, the connection converter converts, during execution of the streaming application, at least one dynamic connection in the streaming application to a corresponding static connection.

3. The apparatus of claim 2 wherein the conversion criteria for converting dynamic connections to static connections comprise:
a usage threshold;
a user role;
a processing deadline; and
an end user request.

4. The apparatus of claim 3 wherein the usage threshold specifies a data tuple threshold rate, and when a rate of data tuples on a selected dynamic connection is greater than the data tuple threshold rate, the connection converter converts the selected dynamic connection to a static connection.

5. The apparatus of claim 1 wherein the conversion criteria for converting static connections to dynamic connections comprise:

a usage threshold;
a user role;
a processing deadline;
an end user request; and
duplicate processing elements.

6. The apparatus of claim 5 wherein the usage threshold specifies a data tuple threshold rate, and when a rate of data tuples on a selected static connection is less than the data tuple threshold rate, the connection converter converts the selected static connection to a dynamic connection.

7. The apparatus of claim 1 wherein the connection converter converts a first static connection between first and second processing elements in the streaming application to a corresponding dynamic connection by:
the second processing element activating an idle import endpoint in the second processing element;
the second processing element requesting the streams manager setup a dynamic connection from the first processing element to the second processing element;
the streams manager processing the request from the second processing element and sending the request to the first processing element;
in response to receiving the request, the first processing element initializes an idle export endpoint in the first processing element;
once the streams manager connects the dynamic connection between the first processing element and the second processing element, tuples flow from the first processing element through the dynamic connection to the second processing element; and
disabling the static connection between the first processing element and the second processing element.

8. The apparatus of claim 2 wherein the connection converter converts a first dynamic connection between first and second processing elements in the streaming application to a corresponding static connection by:
the second processing element registering a static input port of the second processing element with the streams manager;
the second processing element requesting the streams manager to replace the dynamic connection from the first processing element to the second processing element with a static connection;
the streams manager processing the request from the second processing element and sending the request to the first processing element;
when the first processing element does not notify the streams manager to allow conversion of the first dynamic connection, aborting the conversion of the first dynamic connection; and
when the first processing element notifies the streams manager to allow conversion of the first dynamic connection:
the first processing element sets up a static connection to the second processing element based on the static input port of the second processing element;
once the streams manager connects the static connection between the first processing element and the second processing element, tuples flow from the first processing element through the static connection to the second processing element; and
disabling the dynamic connection between the first processing element and the second processing element.

9. The apparatus of claim 2 wherein the connection converter converts a first dynamic connection between first and second processing elements in the streaming application to a first corresponding static connection and converts a second dynamic connection between a third processing element and the second processing in the streaming application to a second corresponding static connection by:
the second processing element registering a static input port of the second processing element with the streams manager;
the second processing element requesting the streams manager to replace the first dynamic connection from the first processing element to the second processing element with a first static connection;
the second processing element requesting the streams manager to replace the second dynamic connection from the third processing element to the second processing element with a second static connection;
the streams manager processing the request from the second processing element and sending the request to the first processing element and to the third processing element;
when either of the first processing element and the third processing element does not notify the streams manager to allow conversion of the first dynamic connection, aborting the conversion of the first dynamic connection;
when both the first processing element and the third processing element notify the streams manager to allow conversion of the first and second dynamic connections:
the first processing element sets up the first static connection to the second processing element based on the static input port of the second processing element;
the third processing element sets up the second static connection to the second processing element based on the static input port of the second processing element;
once the streams manager connects the first static connection between the first processing element and the second processing element, tuples flow from the first processing element through the static connection to the second processing element;
once the streams manager connects the second static connection between the third processing element and the second processing element, tuples flow from the third processing element through the static connection to the second processing element;
disabling the dynamic connection between the first processing element and the second processing element; and
disabling the second dynamic connection between the third processing element and the second processing element.

10. A computer-implemented method executed by at least one processor for converting connections in a streaming application, the method comprising:
a streams manager executing a streaming application that comprises a flow graph that comprises:
a plurality of processing elements; and
a plurality of static connections between the plurality of processing elements;
monitoring conversion criteria for converting static connections to dynamic connections;
determining that the conversion criteria is satisfied for a static connection between two processing elements, wherein the static connection is a connection between processing elements that is defined at compile-time; and responsive to determining that the conversion criteria is satisfied, converting, during execution of the streaming application, the static connection between the two processing elements to a dynamic connection between the two processing elements, wherein the dynamic connection is a connection between the two processing elements that can be dynamically created as the streaming application runs.

11. The method of claim 10 further comprising:
creating at least one dynamic connection between the plurality of processing elements as the streaming application is executed by the streams manager;
monitoring conversion criteria for converting dynamic connections to static connections; and
when at least one of the conversion criteria for converting dynamic connections to static connections is satisfied, converting during execution of the streaming application at least one dynamic connection in the streaming application to a corresponding static connection.

12. The method of claim 11 wherein the conversion criteria for converting dynamic connections to static connections comprise:
a usage threshold;
a user role;
a processing deadline; and
an end user request.

13. The method of claim 12 wherein the usage threshold specifies a data tuple threshold rate, and when a rate of data tuples on a selected dynamic connection is greater than the data tuple threshold rate, the connection converter converts the selected dynamic connection to a static connection.

14. The method of claim 10 wherein the conversion criteria for converting static connections to dynamic connections comprise:
a usage threshold;
a user role;
a processing deadline;
an end user request; and
duplicate processing elements.

15. The method of claim 14 wherein the usage threshold specifies a data tuple threshold rate, and when a rate of data tuples on a selected static connection is less than the data tuple threshold rate, the connection converter converts the selected static connection to a dynamic connection.

16. The method of claim 10 wherein converting a first static connection between first and second processing elements in the streaming application to a corresponding dynamic connection comprises:
the second processing element activating an idle import endpoint in the second processing element;
the second processing element requesting the streams manager setup a dynamic connection from the first processing element to the second processing element;
the streams manager processes the request from the second processing element and sending the request to the first processing element;
in response to receiving the request, the first processing element initializes an idle export endpoint in the first processing element;
once the streams manager connects the dynamic connection between the first processing element and the second processing element, tuples flow from the first processing element through the dynamic connection to the second processing element; and
disabling the static connection between the first processing element and the second processing element.

17. The method of claim 11 wherein converting a first dynamic connection between first and second processing elements in the streaming application to a corresponding static connection comprises:
the second processing element registering a static input port of the second processing element with the streams manager;
the second processing element requesting the streams manager to replace the dynamic connection from the first processing element to the second processing element with a static connection;
the streams manager processing the request from the second processing element and sending the request to the first processing element;
when the first processing element does not notify the streams manager to allow conversion of the first dynamic connection, aborting the conversion of the first dynamic connection; and
when the first processing element notifies the streams manager to allow conversion of the first dynamic connection:
the first processing element sets up a static connection to the second processing element based on the static input port of the second processing element;
once the streams manager connects the static connection between the first processing element and the second processing element, tuples flow from the first processing element through the static connection to the second processing element; and
disabling the dynamic connection between the first processing element and the second processing element.

18. The method of claim 11 wherein converting a first dynamic connection between first and second processing elements in the streaming application to a first corresponding static connection and converting a second dynamic connection between a third processing element and the second processing in the streaming application to a second corresponding static connection comprises:
the second processing element registering a static input port of the second processing element with the streams manager;
the second processing element requesting the streams manager to replace the first dynamic connection from the first processing element to the second processing element with a first static connection;
the second processing element requesting the streams manager to replace the second dynamic connection from the third processing element to the second processing element with a second static connection;
the streams manager processing the request from the second processing element and sending the request to the first processing element and to the third processing element;
when either of the first processing element and the third processing element does not notify the streams manager to allow conversion of the first dynamic connection, aborting the conversion of the first dynamic connection;
when both the first processing element and the third processing element notify the streams manager to allow conversion of the first and second dynamic connections:
the first processing element sets up the first static connection to the second processing element based on the static input port of the second processing element;

the third processing element sets up the second static connection to the second processing element based on the static input port of the second processing element;

once the streams manager connects the first static connection between the first processing element and the second processing element, tuples flow from the first processing element through the static connection to the second processing element;

once the streams manager connects the second static connection between the third processing element and the second processing element, tuples flow from the third processing element through the static connection to the second processing element;

disabling the dynamic connection between the first processing element and the second processing element; and disabling the second dynamic connection between the third processing element and the second processing element.

19. A computer-implemented method executed by at least one processor for converting connections in a streaming application, the method comprising:

a streams manager executing a streaming application that comprises a flow graph that comprises:
 a plurality of processing elements;
 a plurality of static connections between the plurality of processing elements, wherein static connections are connections between processing elements that are defined at compile-time; and
 at least one dynamic connection between the plurality of processing elements, wherein the at least one dynamic connection is a connection between two processing elements that can be dynamically created as the streaming application runs;

monitoring conversion criteria for converting static connections to dynamic connections, wherein the conversion criteria for converting dynamic connections to static connections comprises a first usage threshold that specifies a first data tuple threshold rate;

determining that a rate of data tuples on a selected static connection between a first processing element and a second processing element is less than the first usage threshold;

responsive to determining that the rate of data tuples on the selected static connection between the first processing element and the second processing element is less than the first usage threshold, converting, during execution of the streaming application, the first static connection between the first processing element and the second processing element to a dynamic connection by:
 the second processing element activating an idle import endpoint in the second processing element;
 the second processing element requesting the streams manager setup a dynamic connection from the first processing element to the second processing element;
 the streams manager processes the request from the second processing element and sending the request to the first processing element;
 in response to receiving the request, the first processing element initializes an idle export endpoint in the first processing element;
 once the streams manager connects the dynamic connection between the first processing element and the second processing element, tuples flow from the first processing element through the dynamic connection to the second processing element; and
 disabling the static connection between the first processing element and the second processing element;

monitoring conversion criteria for converting dynamic connections to static connections, wherein the conversion criteria for converting dynamic connections to static connections comprises a second usage threshold that specifies a second data tuple threshold rate;

when a rate of data tuples on a selected dynamic connection between the third and fourth processing elements is greater than the second usage threshold, converting during execution of the streaming application the first dynamic connection between the third and fourth processing elements in the streaming application to a corresponding static connection by:
 the fourth processing element registering a static input port of the fourth processing element with the streams manager;
 the fourth processing element requesting the streams manager to replace the dynamic connection from the third processing element to the fourth processing element with a static connection;
 the streams manager processing the request from the fourth processing element and sending the request to the third processing element;
 when the third processing element does not notify the streams manager to allow conversion of the first dynamic connection, aborting the conversion of the first dynamic connection; and
 when the third processing element notifies the streams manager to allow conversion of the first dynamic connection:
  the third processing element sets up a static connection to the fourth processing element based on the static input port of the fourth processing element;
  once the streams manager connects the static connection between the third processing element and the fourth processing element, tuples flow from the third processing element through the static connection to the fourth processing element; and
  disabling the dynamic connection between the third processing element and the fourth processing element.

\* \* \* \* \*